United States Patent
Kaushikkar

(10) Patent No.: US 8,904,073 B2
(45) Date of Patent: Dec. 2, 2014

(54) COHERENCE PROCESSING WITH ERROR CHECKING

(71) Applicant: Apple Inc., Cupertino, CA (US)

(72) Inventor: Harshavardhan Kaushikkar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 15 days.

(21) Appl. No.: 13/803,769

(22) Filed: Mar. 14, 2013

(65) Prior Publication Data

US 2014/0281190 A1    Sep. 18, 2014

(51) Int. Cl.
*G06F 3/00* (2006.01)
*G06F 13/00* (2006.01)
*G06F 12/08* (2006.01)
*G06F 9/44* (2006.01)
*G06F 13/10* (2006.01)

(52) U.S. Cl.
CPC .............. *G06F 12/0815* (2013.01); *G06F 3/00* (2013.01); *G06F 9/4411* (2013.01); *G06F 13/102* (2013.01)
USPC .................................. 710/100; 710/8; 710/18

(58) Field of Classification Search
CPC ........ G06F 9/4411; G06F 13/102; G06F 3/00
See application file for complete search history.

(56) References Cited

U.S. PATENT DOCUMENTS

| | | | |
|---|---|---|---|
| 7,437,534 B2 | 10/2008 | Tremblay et al. | |
| 7,761,687 B2 | 7/2010 | Blumrich et al. | |
| 8,195,883 B2 * | 6/2012 | Jain et al. | 711/122 |

FOREIGN PATENT DOCUMENTS

WO    2007/041392 A2    4/2007

* cited by examiner

*Primary Examiner* — Zachary K Huson
(74) *Attorney, Agent, or Firm* — Meyertons, Hood, Kivlin, Kowert & Goetzel, P.C.

(57) ABSTRACT

An apparatus for processing and tracking the progress of coherency transactions in a computing system is disclosed. The apparatus may include a finite-element state machine, a processor, and a scoreboard circuit. The finite-element state machine may be configured to track the progress of a transaction as well as detect errors during the processing of the transaction. The processor may be configured to transmit coherence requests dependent upon the transaction. The scoreboard circuit may be configured to track the requests and associate responses.

20 Claims, 12 Drawing Sheets

COHERENCE PROCESSING WITH ERROR CHECKING

BACKGROUND

1. Technical Field

This invention relates to computing systems, and more particularly, maintaining coherency among multiple cache memories.

2. Description of the Related Art

Computing systems may include one or more systems-on-a-chip (SoC), which may integrate a number of different functions, such as, graphics processing, onto a single integrated circuit. With numerous functions included in a single integrated circuit, chip count may be kept low in mobile computing systems, such as tablets, for example, which may result in reduced assembly costs, and a smaller form factor for such mobile computing systems.

To implement the desired functions on an SoC, one or more processors may be employed. Each processor may include a memory system with multiple levels of caches for providing low latency access to program instructions and operands. With multiple processors accessing multiple caches as well as main memory, the issue of cache coherency may arise. For example, a given data producer, such as, e.g., one of processors, may write a copy of data in a cache, but the update to main memory's copy of the data may be delayed. In writethrough caches, a write operation may be dispatched to memory in response to the write to the cache line, but the write is delayed in time. In a writeback cache, writes are made in the cache and not reflected in memory until the updated cache block is replaced in the cache (and is written back to main memory in response to the replacement).

Because the updates have not been made to main memory at the time the updates are made in cache, a given data consumer, such as, e.g., another processor, may read the copy of data in main memory and obtain "stale" data (data that has not yet been updated). A cached copy in a cache other than the one to which a data producer is coupled can also have stale data. Additionally, if multiple data producers are writing the same memory locations, different data consumers could observe the writes in different orders.

Cache coherence solves these problems by ensuring that various copies of the same data (from the same memory location) can be maintained while avoiding "stale data", and by establishing a "global" order of reads/writes to the memory locations by different producers/consumers. If a read follows a write in the global order, the data read reflects the write. Typically, caches will track a state of their copies according to the coherence scheme. For example, the popular Modified, Exclusive, Shared, Invalid (MESI) scheme includes a modified state (the copy is modified with respect to main memory and other copies); an exclusive state (the copy is the only copy other than main memory); a shared state (there may be one or more other copies besides the main memory copy); and the invalid state (the copy is not valid). The MOESI scheme adds an Owned state in which the cache is responsible for providing the data for a request (either by writing back to main memory before the data is provided to the requestor, or by directly providing the data to the requester), but there may be other copies in other caches. Maintaining cache coherency is increasingly challenging as various different types of memory requests referencing uncacheable and cacheable regions of the address space are processed by the processor(s).

SUMMARY OF THE EMBODIMENTS

Various embodiments of a circuit and method for tracking transactions from one or more functional blocks on an integrated circuit are disclosed. Broadly speaking, an apparatus and a method are contemplated in which a finite-state machine may be configured to track the progress of a transaction. A processor may be configured to transmit coherency requests to the functional blocks dependent upon the transaction. A scoreboard circuit may be configured to track the coherency requests and respective responses. The finite-state machine may be further configured to detect errors in the received responses.

In one embodiment, the scoreboard circuit may include a plurality of registers. Each of the registers may be set dependent upon one of the coherency requests.

In a further embodiment, the scoreboard circuit may be configured to generate a completion signal. The generation of the completion signal may be dependent upon the logical state of the registers.

BRIEF DESCRIPTION OF THE DRAWINGS

The following detailed description makes reference to the accompanying drawings, which are now briefly described.

Figure 1:
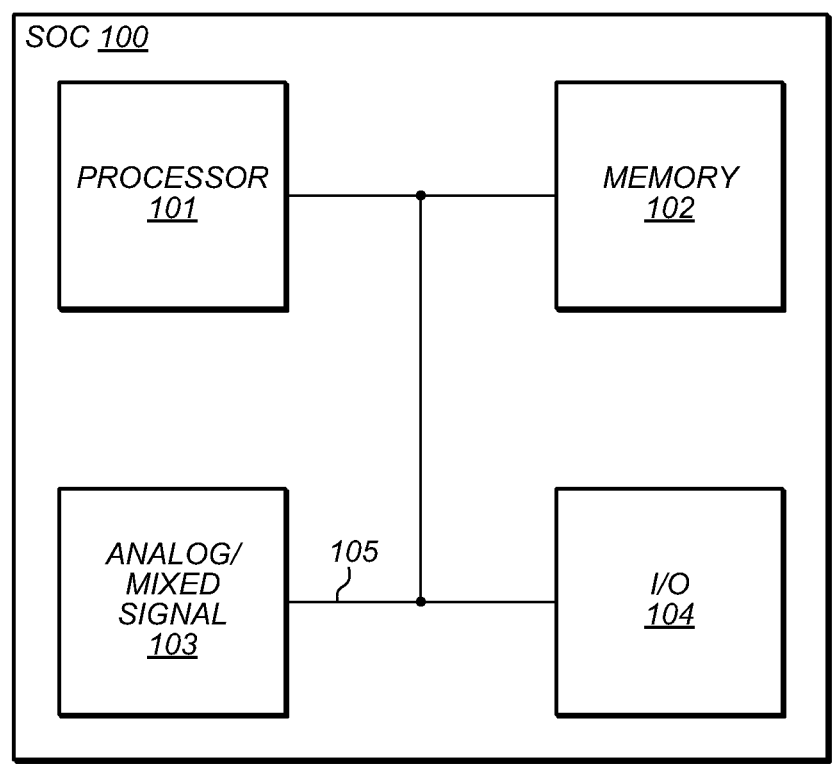
FIG. 1 illustrates an embodiment of a system on a chip.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

To improve computational performance, a system-on-a-chip (SoC) may include multiple processors. Each processor may employ a local cache memory to provide rapid access to local copies of instructions and operands. In some cases, there may be multiple copies of an operand. For example, there may a copy of an operand in main memory in addition to a copy in each cache memory employed. When one of the copies of the operand is changed, the other copies must be updated as well. Maintaining consistency of data across the various memories is commonly referred to as maintaining "cache coherence."

To maintain coherence between main memory and various cache memories, requests may be sent to processors or other functional blocks within the SoC to perform certain tasks or provide certain data. The requests and their associated responses may occur at various points in time making a determination of the progress of the transaction difficult. The embodiments illustrated in the drawings and described below may provide techniques for maintaining cache coherence, while improving the ability to track the progress of transactions and detect error conditions.

System-on-a-Chip Overview

A block diagram of an SoC is illustrated in FIG. 1. In the illustrated embodiment, SoC 100 includes a processor 101 coupled to memory block 102, and analog/mixed-signal block 103, and I/O block 104 through internal bus 105. In various embodiments, SoC 100 may be configured for use in a mobile computing application such as, e.g., a tablet computer or cellular telephone. Transactions on internal bus 105 may be encoded according to one of various communication protocols. For example, transactions may be encoded using Peripheral Component Interconnect Express (PCIe®), or any other suitable communication protocol.

Memory block 102 may include any suitable type of memory such as a Dynamic Random Access Memory (DRAM), a Static Random Access Memory (SRAM), a Read-only Memory (ROM), Electrically Erasable Programmable Read-only Memory (EEPROM), a FLASH memory, Phase Change Memory (PCM), or a Ferroelectric Random Access Memory (FeRAM), for example. It is noted that in the embodiment of an SoC illustrated in FIG. 1, a single memory block is depicted. In other embodiments, any suitable number of memory blocks may be employed.

As described in more detail below, processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA).

Analog/mixed-signal block 103 may include a variety of circuits including, for example, a crystal oscillator, a phase-locked loop (PLL), an analog-to-digital converter (ADC), and a digital-to-analog converter (DAC) (all not shown). In other embodiments, analog/mixed-signal block 103 may be configured to perform power management tasks with the inclusion of on-chip power supplies and voltage regulators. Analog/mixed-signal block 103 may also include, in some embodiments, radio frequency (RF) circuits that may be configured for operation with cellular telephone networks.

I/O block 104 may be configured to coordinate data transfer between SoC 100 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O block 104 may be configured to implement a version of Universal Serial Bus (USB) protocol or IEEE 1394 (Firewire®) protocol.

I/O block 104 may also be configured to coordinate data transfer between SoC 100 and one or more devices (e.g., other computer systems or SoCs) coupled to SoC 100 via a network. In one embodiment, I/O block 104 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, I/O block 104 may be configured to implement multiple discrete network interface ports.

Each of the functional blocks included in SoC 100 may be included in separate power and/or clock domains. In some embodiments, a functional block may be further divided into smaller power and/or clock domains. Each power and/or clock domain may, in some embodiments, be separately controlled thereby selectively deactivating (either by stopping a clock signal or disconnecting the power) individual functional blocks or portions thereof.

Figure 2:
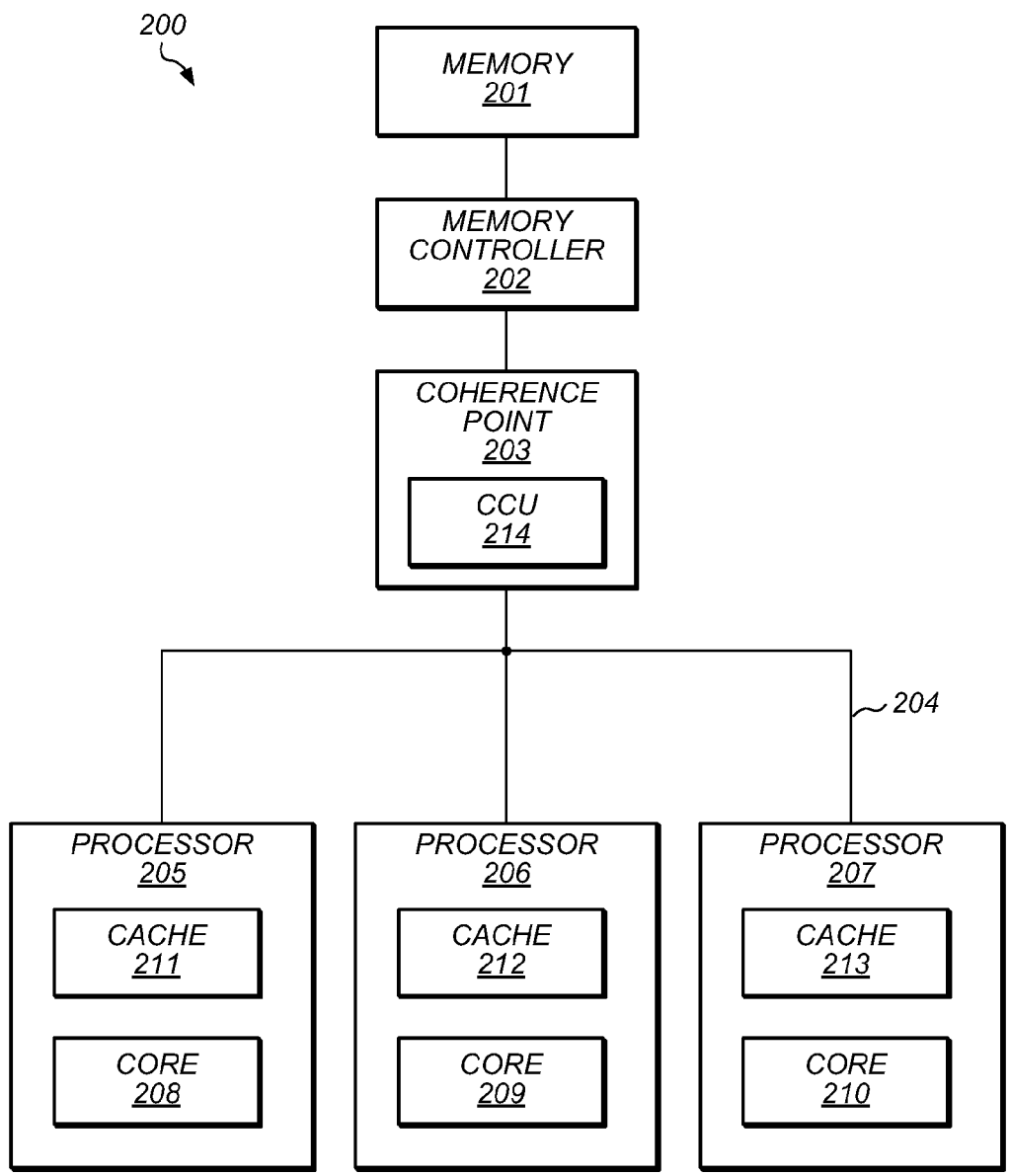
FIG. 2 illustrates another embodiment of a system on a chip.

Turning to FIG. 2, another embodiment of an SoC is depicted. In the illustrated embodiment, SoC 200 includes a memory 201, a memory controller 202, a coherence point circuit 203, and processors 205, 206, and 207. Processor 205 includes processor core 208 and cache memory 211. Similarly, processor 206 includes processor core 209 and cache memory 212, and processor 207 includes processor core 210 and cache memory 213.

Each of processors 208, 209, and 210 are coupled to coherence point circuit 203 through bus 204. It is noted that although only three processors are depicted, in other embodiments, different numbers of processors as well as other functional blocks (also referred to herein as "agents") may be coupled to bus 204.

Memory 201 may, in some embodiments, include one or more DRAMs, or other suitable memory device. Memory 201 is coupled to memory controller 202 which may be configured to generate control signals necessary to perform read and write operations to memory 201. In some embodiments, memory controller 202 may implement one of various communication protocols, such as, e.g., a synchronous double data rate (DDR) interface.

In some embodiments, coherence point circuit 203 may include a coherence control unit (CCU) 214. CCU 214 may be configured to receive requests and responses (collectively referred to as "transactions") between processors 208, 209, and 210, and memory 201. Each received transaction may be evaluated in order to maintain coherency across cache memories 211, 212, and 213, and memory 201. CCU 214 may maintain coherency using one of various coherency protocols such as, e.g., Modified Share Invalid (MSI) protocol, Modified Owned Exclusive Shared Invalid (MOESI) protocol, or any other suitable coherency protocol. Although only one CCU is depicted in FIG. 2, in other embodiments, coherence point circuit 203 may include any suitable number of CCUs.

Cache memories 211, 212, and 213 may be designed in accordance with one of various design styles. For example, in some embodiments, cache memories 211, 212, and 213 may be fully associative, while in other embodiments, the memories may be direct-mapped. Each entry in the cache memories may include a "tag" (which may include a portion of the address of the actual data fetched from main memory). In some embodiments, coherence point circuit 203 may include a set of duplicate tags for the cache entries in each of cache memories 211, 212, and 213.

It is noted that embodiment of an SoC illustrated in FIG. 2 is merely an example. In other embodiments, different numbers of processors and other functional blocks may be employed.

Coherence Processing

Figure 3:
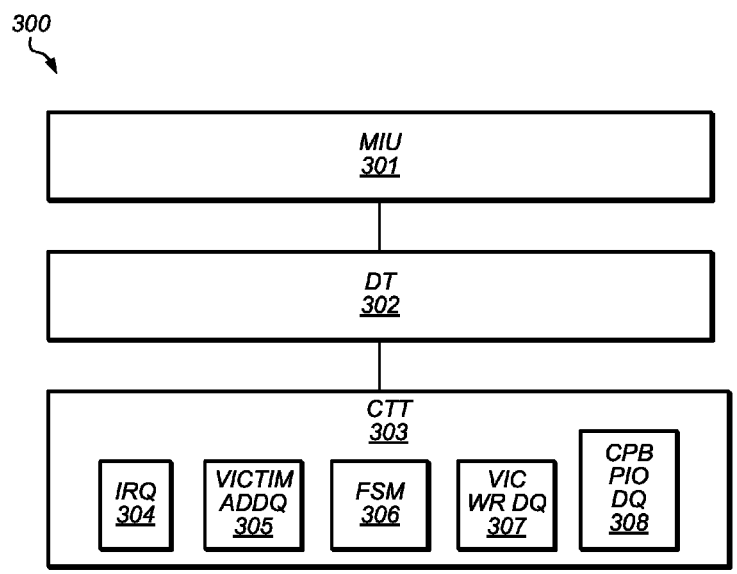
FIG. 3 illustrates an embodiment of a coherence control unit.

Turning to FIG. 3, an embodiment of a coherency control unit (CCU) is illustrated. CCU 300 may, in some embodiments, correspond to CCU 213 in coherence point circuit 203 of SoC 200 as illustrated in FIG. 2. In the illustrated embodiment, CCU 300 includes memory interface unit (MIU) 301, duplicate tag (DT) pipeline 302, and current transaction table (CTT) 303. MIU 301 interfaces to a memory controller (not shown), and is coupled to DT 302. CTT 303 interfaces to one or more agents (not shown) and is also coupled to DT 302.

MIU 301 may be configured to send read and write requests leaving CCU 300 to a memory controller, such a memory controller 202 as depicted in SoC 200 as illustrated in FIG. 2. In some embodiments, MIU 301 may send read and write requests to the memory controller from multiple sources, such as, e.g., speculative reads, writes from a victim write data queue, and writes from the copy back queue. MIU 301 may include an arbitration circuit which selects between the various sources of read and write requests. In some embodiments, the arbitration circuit may perform a least recently granted (LRG) algorithm, or any other suitable arbitration algorithm.

DT 302 may be configured to store copies of cache tags (collectively referred to as "duplicate tags"), such as the tags from cache memories 211, 212, and 213 as illustrated in FIG. 2. Access to the duplicate tags may be controlled by a multi-stage pipeline. In some embodiments, incoming addresses may be compared with the duplicate tags to determine which, if any, agent's cache memories contain the cache block associated with the incoming address. When a match is found (commonly referred to as a "cache hit"), the transaction may require coherence processing, i.e., verifying that all copies of requested cache block have the same data. When no match is found (commonly referred to as a "cache miss"), the transaction associated with the incoming address may not require coherence processing, and any associated memory operations may be sent to a memory through MIU 301.

In various embodiments, CTT 303 may include an incoming request queue (IRQ) 304, a victim address queue 305, a victim write data queue 307, a copy back peripheral input/output (PIO) response queue 308, and a coherence processing/snoop control (finite-state machine) FSM and scoreboard logic 306.

All incoming requests may be stored in IRQ 304. The requests may remain in IRQ 304 for varying durations dependent upon the time required to process the transaction. IRQ 304 may contain any suitable number of entries, and a credit-based control mechanism may be employed by CCU 300 to determine whether new requests may be added to the IRQ 304. In some embodiments, multiple flip-flops may be employed to implement each entry of IRQ 304. The number of flip-flops may, in other embodiments, correspond to the number of data bits within a data packet transmitted on a bus, such as, e.g., bus 204 as illustrated in FIG. 2.

In coming requests may be compared against existing entries in IRQ 304 in order to establish any dependencies. In some embodiments, requests stored in IRQ 304 may be sent to DT 302 for tag lookup.

Each received read request from an agent may contain the request address and way information necessary to identify which way the line will fill in the requesting agent's cache memory. In some cases, a cache line may already be at the location specified by the received request address and way information. Such a cache line is commonly referred to as a "victim line" and may need to be written back to memory (also referred to herein as being "evicted") before that location in the cache may be filled.

When a victim line is either in the modified or owned state in a cache memory, the cache line may be dirty, i.e., the line has been changed from its original state, and the requesting agent may be required to write the victim cache line back to memory. For the duration that CCU 300 is processing a transaction with a given victim address, no other transaction to the same address as the victim address may be allowed to proceed. To ensure that no other transactions proceed, dependency checking is performed. To allow for dependency checking, each incoming victim address may be stored in victim address queue 305. In some embodiments, there may be one entry in victim address queue 305 for each transaction entry in CTT 303. Victim address queue 305 may, in some embodiments, employ a flip-flops and a content-addressable memory (CAM) structure to facilitate dependency checking.

For each request that has an associated victim, CCU 300 may send a pull victim request to the requesting agent to retrieve the victim cache line. In response to the pull victim request, the agent responds with the cache line being evicted. The cache line may be stored in victim write data queue 307 until coherence processing FSM 306 arbitrates and writes the data to memory, such as memory 201 as illustrated in FIG. 2. In some embodiments, there may be one entry in victim write data queue 307 for each transaction entry in CTT 303.

Read requests that generate a hit within DT 302 may receive data from one or more of the cache memories. Such data is labeled as copy back data and may be stored in copy back PIO response queue 308, and write requests of copy back data may be initiated from copy back PIO response queue 308. In some embodiments, copy back PIO response queue 308 may be implement using dual-port static random access memories (SRAMs) or any other suitable memory circuit. In some embodiments, data returned from PIO transaction may be stored in copy back PIO response queue 308 before the data is forwarded onto the requesting agent.

Processing of coherence transactions may be controlled by coherence processing/snoop control FSM and scoreboard logic 306. The scoreboard logic may, in various embodiments, track requests and corresponding response to the requests from agents within an SoC, such as, e.g., SoC 200 as illustrated in FIG. 2. In some embodiments, one instance of coherence processing/snoop control FSM and scoreboard logic 306 may included per entry in CTT 303.

The FSM portion of coherence processing/snoop control FSM and scoreboard logic 306 may, in some embodiments, be implemented as a sequential logic circuit, i.e., a logic circuit whose next logical state is dependent on the current logical state in additional to present input, configured to transition through a pre-determined number of logical states. The sequential logic circuit may include one or more flip-flop circuits. Each flip-flop circuit may be implemented in accordance with any number of design styles, such as, e.g., dynamic or static circuit design styles.

The scoreboard may be implemented using one or more state registers. Each of the state registers may be set when a corresponding event occurs, or when a request is made by the coherence processing logic to either the memory or an agent. A state register may be reset when an expected event has occurred, or when a request that has been made progresses. In some embodiments, the logical state of the state registers may be combined to form a signal indicating that coherence processing for the transaction associate with the scoreboard has completed.

The scoreboard may be organized to manage multiple independent sets of operations or "flows" associated with a given transaction. For example, a read request that has a victim and encounters a hit in DT 302 may need to simultaneously utilize a flow of coherence handling and a flow for victim handling. One both flows have completed, the scoreboard may assert the signal indicating that coherence processing has completed, which may allow the FSM to relinquish the transaction entry in IRQ 304.

It is noted that the embodiment illustrated in FIG. 3 is merely an example. In other embodiments, different functional blocks and different configurations of functional blocks are possible and contemplated.

Figure 4:
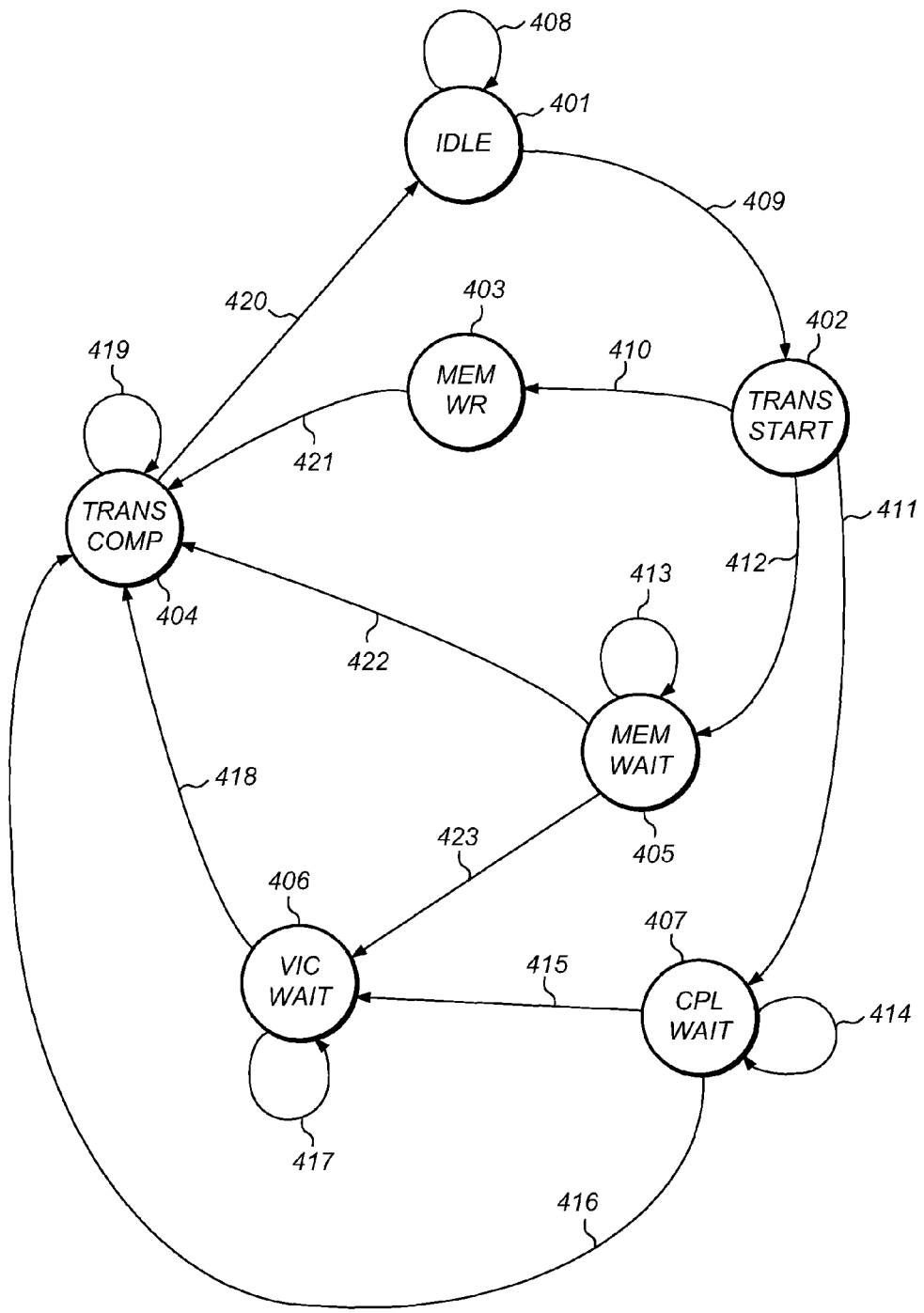
FIG. 4 illustrates an embodiment of a state diagram depicting operation of a snoop control state machine.

A state diagram depicting an embodiment the operation of a coherence processing FSM, such as, e.g., coherence processing/snoop control FSM 306 of CTT 300 as illustrated in FIG. 3, is illustrated in FIG. 4.

Referring collectively to the state diagram depicted in FIG. 4, and CCU 300 as illustrated in FIG. 3, the operation may begin with the FSM in IDLE state 401. The FSM may remain in IDLE state 401 (transition 408) until the transaction corresponding the FSM is selected from an incoming transaction queue, such as, e.g., IRQ 304 as illustrated in FIG. 3. Once the corresponding transaction has been selected and the transaction is free of any dependencies, the FSM may move into TRANS_START state 402 (transition 409).

Once in TRANS_START state 402, the address contained in the transaction is checked against the entries in DT 302. The FSM may remain in TRANS_START state 402 until results are available from DT 302 (transition 424). When the results from DT 302 indicate a hit, or the transaction is a PIO transaction, the FSM may then move to CPL_WAIT state 407 (transition 411). When the results from DT 302 indicate a miss, and the transaction involves a write, the FSM may move into MEM_WR state 403 (transition 410). When the transaction involves a read and the results from DT 302 indicate a miss, the FSM may move into MEM_WAIT state 405 (transition 412).

When the FSM is in the MEM_WR state 403, a write request is dispatched, and the FSM waits for a write response to be ordered. Once the write response has been ordered, the FSM may move into TRANS_COMP state 404 (transition 421).

Once in MEM_WAIT state 405, the FSM wait for the fill response to be ordered (transition 413). Once the fill has been ordered and no victim handling is required, the FSM may move to TRANS_COMP state 404 (transition 422). When victim handling is required, the FSM may move to VIC_WAIT state 406 (transition 423).

The FSM may remain in CPL_WAIT state 407 while the required coherence processing is being performed (transition 414). Once it is determined that the required coherence processing has been performed, and no victim handling is needed, the FSM may move to TRANS_COMP state 404 (transition 416). In some embodiments, the determination that the coherence processing has been completed may be performed by scoreboard logic, such as, e.g., the scoreboard logic included in coherence processing/snoop control FSM and scoreboard logic 306 as illustrated in FIG. 3. When victim handling is required, the FSM may move to VIC_WAIT state 406 (transition 415).

The FSM may remain in VIC_WAIT state 406 until the necessary victim handling has been performed (transition 417). Once the victim data has arrived in the victim data queue, such as, e.g., victim write data queue 307 as illustrated in FIG. 3, and has been sent from the victim data queue to the memory for storage, the FSM may move to TRANS_COMP state 404 (transition 418).

The FSM may remain in TRANS_COMP state 404 while performing certain clean-up tasks (transition 419). For example, the scoreboard logic included in coherence processing/snoop control FSM and scoreboard logic 306 may be reset, and the FSM may invalidate the entry in CTT 303 which corresponds to the transaction being processed. Linked lists within CTT 303 may also be updated to allow any dependent transactions to proceed. Once any clean-up tasks have been performed, and a credit corresponding to the transaction being processed has been released, the FSM may move back to IDLE state 401 (transition 420).

It is noted that the state diagram illustrated in FIG. 4 is merely an example. In other embodiments, different states and different transitions between states are possible and contemplated.

Figure 5:
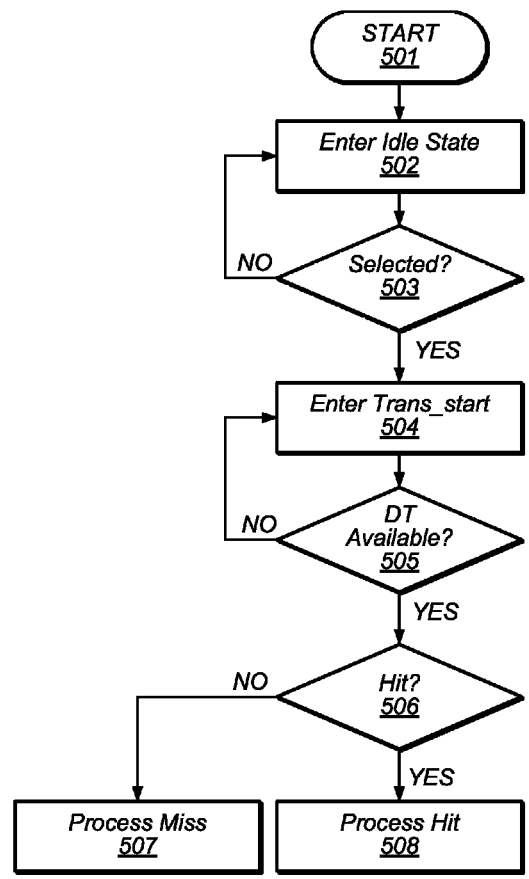
FIG. 5 illustrates a flowchart depicting an embodiment of a method for operating a snoop control state machine.

An embodiment of a method for operating a FSM, such as, e.g., coherence processing/snoop control FSM and scoreboard logic 306 as illustrated in FIG. 3, is depicted in FIG. 5. The method begins in block 501. The FSM may then enter an idle state (block 502). In some embodiments, the idle state may correspond to a situation in which the transaction table entry corresponding the FSM is empty. The FSM may, in other embodiments, be waiting for dependencies, i.e., other data necessary to complete the transaction, to be resolved before the transaction may begin while in the idle state.

The method may then depend on whether the transaction corresponding to the FSM has been selected (block 503). In some embodiments, the selection of the transaction for processing may depend on the order in which the transaction was received, and the resolution of any dependencies. When the transaction corresponding to the FSM is not selected, the FSM remains in an idle state (block 502).

When the transaction corresponding to the FSM is selected, the FSM enters a transaction start state (block 504). In some embodiments, the transaction start state may correspond to processing duplicate tag information by a duplicate tag pipeline, such as DT 302 as illustrated in FIG. 3. The method then depends on whether information from the processing of the duplicate tag information is available (block 505). When the duplicate tag information is not available, the FSM remains in the transaction start state (block 504).

When the results from the duplicate tag processing are available, the method may then depend on if the duplicated tag processing indicates a hit (block 506). In some embodiments, a hit may indicate that one or more cache memories contain copies of data at the requested address location in memory. When a hit is detected, the hit is processed (block 508) as will be described below in more detail in reference to the flowchart illustrated in FIG. 8. When a hit is not detected, the miss is processed (block 507) as described below in more detail in reference to the flowchart illustrated in FIG. 7.

It is noted that operations are depicted as being performed in a sequential fashion in the embodiment illustrated in FIG. 5. In other embodiments, one or more operations may be performed in parallel.

Figure 6:
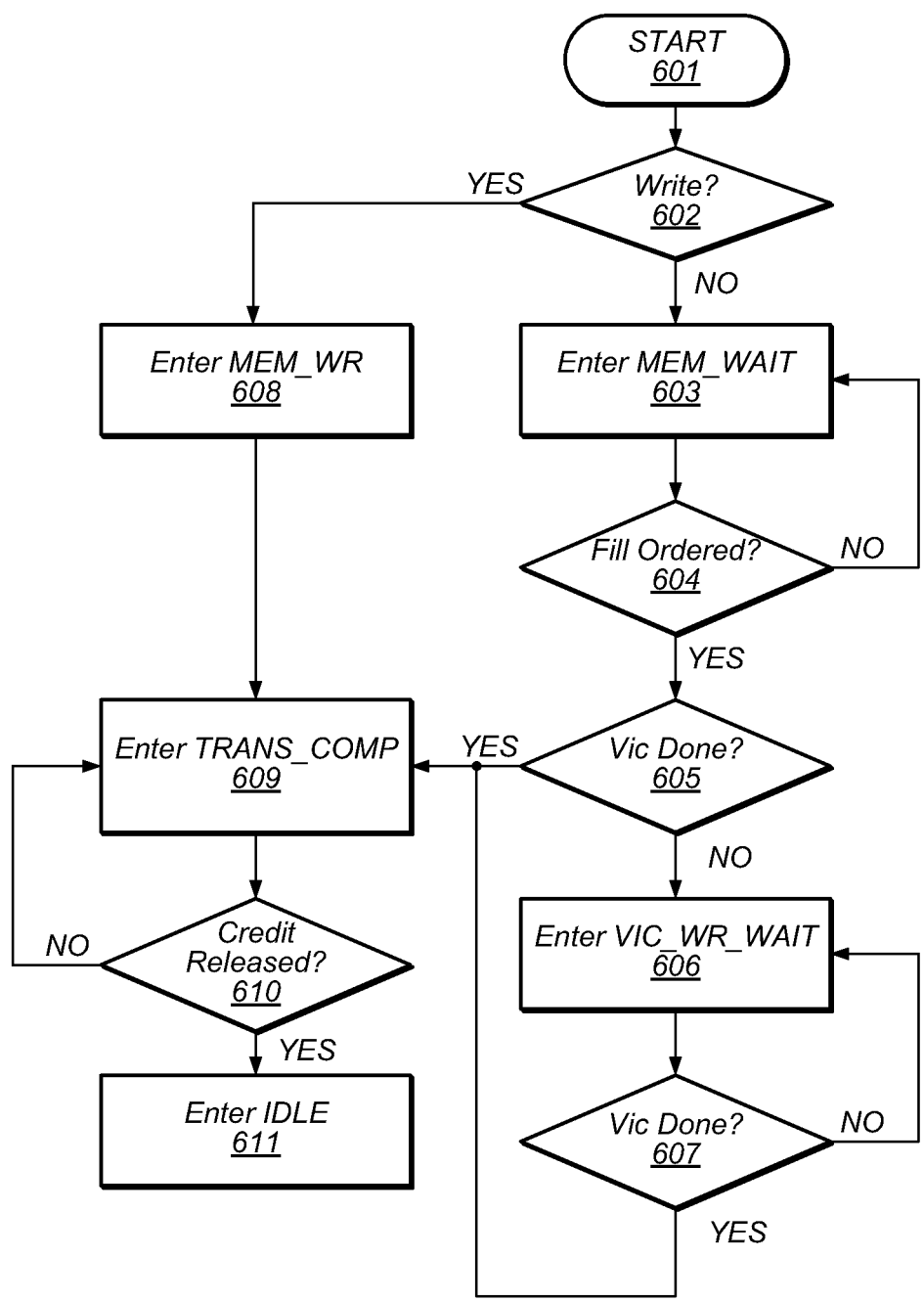
FIG. 6 illustrates a flowchart depicting an embodiment of a method for processing a cache hit.

Turning to FIG. 6, an embodiment of a method for processing a miss is illustrated. In some embodiments, the method illustrated in FIG. 6 may correspond to block 507 of the method depicted in FIG. 5. The method begins in block 601. The method then depends on whether the transaction being tracked by the FSM is a write transaction destined for memory, such as memory 201 as depicted in FIG. 2, for example (block 602). When the transaction is a write transaction destined for memory, the FSM may then enter a memory write state (block 608). Since the transaction is writing to memory, no coherency processing may be needed, and a write request may then be sent to the memory. The FSM may then wait for the write response to be ordered.

Once the write response ordering information has been sent to coherency control unit, the FSM may enter a transaction complete state (block 609). In some embodiments, while in the transaction complete state, the FSM may prepare to invalidate the CTT entry for the transaction and release a credit back to the switch fabric. The FSM may, in other embodiments, update linked lists in the CTT that may allow any dependent transactions to proceed.

The method then depends on whether the credit has been released (block 610). When the credit has not been released back to the switch fabric, the FSM may remain in the transaction complete state (block 609). When the credit is released, the FSM may then transition to an idle state (block 611). In some embodiments, the idle state may correspond to the same state as block 502 as depicted in the flowchart illustrated in FIG. 5.

When the transaction being tracked by the FSM corresponds to a read transaction destined for memory, the FSM may enter a memory wait state (block 603). Since the transaction is a miss, no coherence processing may be needed, and a read request may then be sent to the memory. The method may then depend on whether the read request has been ordered (block 604). When the read request has not been ordered, the FSM may remain in the memory wait state (block 603). When the read request has been ordered, the method may then depend on whether any victim handling is complete (block 605).

A read transaction may have a victim line that needs to be written back into memory prior to the read. When the victim line has been written back into memory, i.e., the victim has been "handled," the FSM may transition to the transaction complete state (block 609) as described above. When the victim has not been handled, the FSM may transition into a victim write wait state (block 606). The method then depends on whether the victim has been handled (block 607). When the victim data has not arrived in the victim data queue to be written to the memory, the FSM may remain in the victim write wait state (block 606). When the victim data has been successfully sent to the memory to for storage, the FSM may then transition to the transaction complete state (block 609) as described above.

It is noted that the method illustrated in FIG. 6 is merely an example. In other embodiments, the method may include additional operations, and operations may be performed in a different order.

Figure 7:
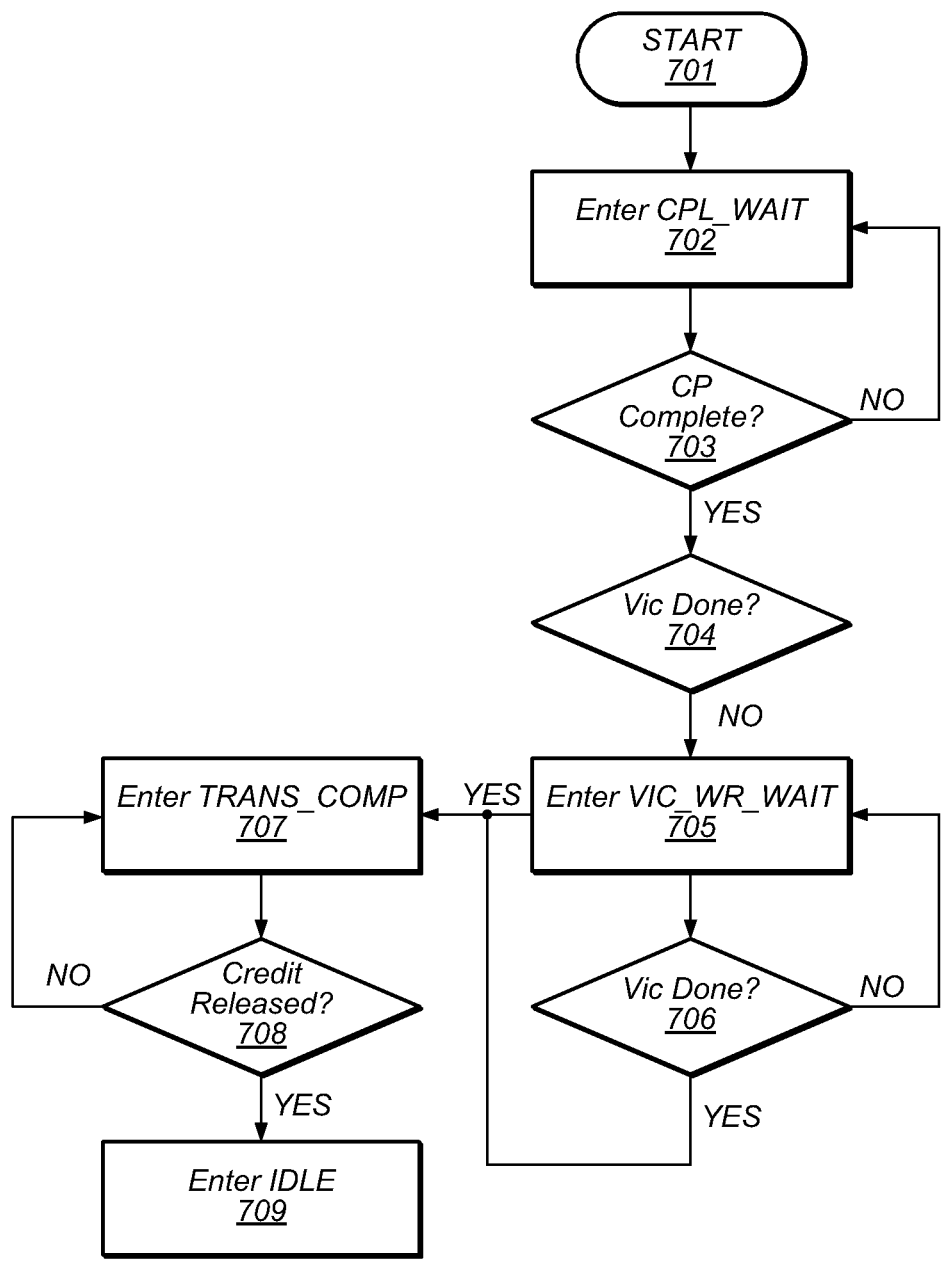
FIG. 7 illustrates a flowchart depicting an embodiment of a method for processing a cache miss.

An embodiment of a method for processing a hit using a FSM is illustrated in FIG. 7. In some embodiments, the method illustrated in FIG. 7 may correspond to the block 508 of the method depicted in FIG. 7. The method begins in block 701. The FSM may then enter a coherence processing logic wait state (block 702). Since it was determined that the transaction being tracked by the FSM involves a hit, coherence processing is required. For example, it may be determined that the data requested in the transaction may be sourced from another cache within an SoC, and that a request to a memory is not necessary.

In some embodiments, a separate logic circuit (commonly referred to as a "scoreboard") may be configured to track the progress of coherent requests and responses, and generate a completion signal. The method may then be dependent on the state of the completion signal (block 704). When the completion signal is inactive, the FSM remains in the coherence processing wait state (block 702). When the completion signal is active, the operation may then depend on whether victim data has been committed to memory (block 704). When the victim data has been committed to memory, the FSM may enter the transaction complete state (block 707). In some embodiments, while in the transaction complete state, the FSM may prepare to invalidate the CTT entry for the transaction and release a credit back to the switch fabric. The FSM may, in other embodiments, update linked lists in the CTT that may allow any dependent transactions to proceed.

The method then depends on whether the credit has been released (block 708). When the credit has not been released back to the switch fabric, the FSM may remain in the transaction complete state (block 707). When the credit is released, the FSM may then transition to an idle state (block 709). In some embodiments, the idle state may correspond to the same state as block 502 as depicted in the flowchart illustrated in FIG. 6.

Figure 8:
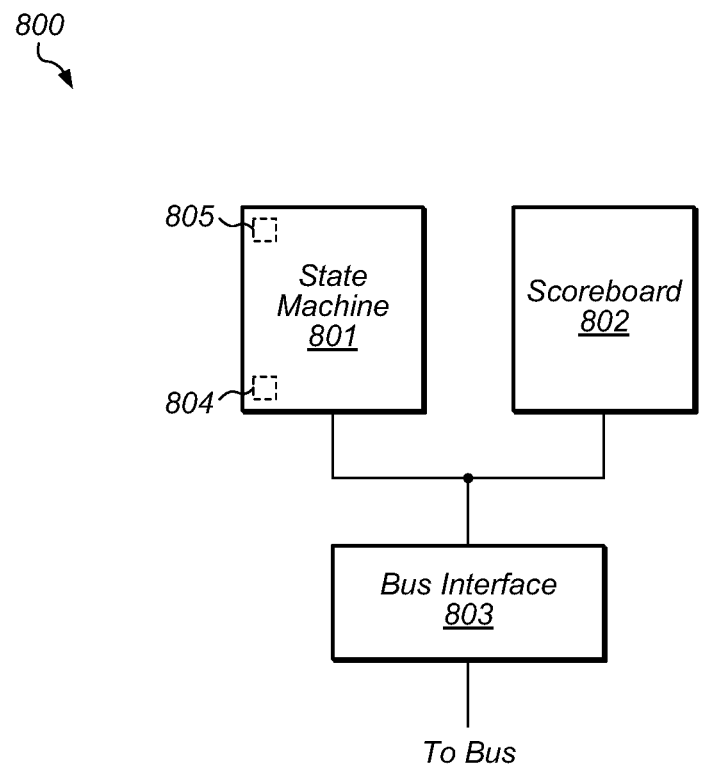
FIG. 8 illustrates a block diagram of an embodiment of a snoop control state machine.

Turning to FIG. 8, an embodiment of a snoop control FSM, such as, e.g., coherence processing/snoop control FSM and scoreboard logic 306 as depicted in FIG. 3, is illustrated. In the illustrated embodiment, snoop control FSM 800 includes state machine 801, scoreboard circuit 802, and bus interface 803.

Bus interface 803 may, in some embodiments, be configured to receive data packets from one or more agents on a communication bus, such as bus 204 of SoC 200 as illustrated in FIG. 2. The received data packets may correspond to responses from one or more agents to messages generated by a coherence processor.

State machine 801 may be implemented in accordance with one of a number of sequential circuit design styles. In some embodiments, state machine 801 may include one or more state elements coupled together to hold a current state. The state elements may include latches or flip-flops, such as, e.g., flip-flop 805. The next state may be generated by one or more combinatorial logic circuits operating on the outputs of the state elements in conjunction with external stimuli. State machine 801 may, in some embodiments, operate in accordance with the state diagram illustrated in FIG. 5. In other embodiments, state machine 801 may include one or more flip-flops, such as flip-flop 805, which may be configured to detect and store unexpected responses from agents. The data stored in such flip-flops (commonly referred to as "shadow flops"), may be used to generate an error signal.

As described above in more detail, scoreboard 802 may be implemented using one or more state registers. Each of the state registers may be set and reset according the progress of requests and responses made during the processing a transaction. In some embodiments, scoreboard 802 may generate a completion signal dependent upon the values of the state registers.

Figure 9:
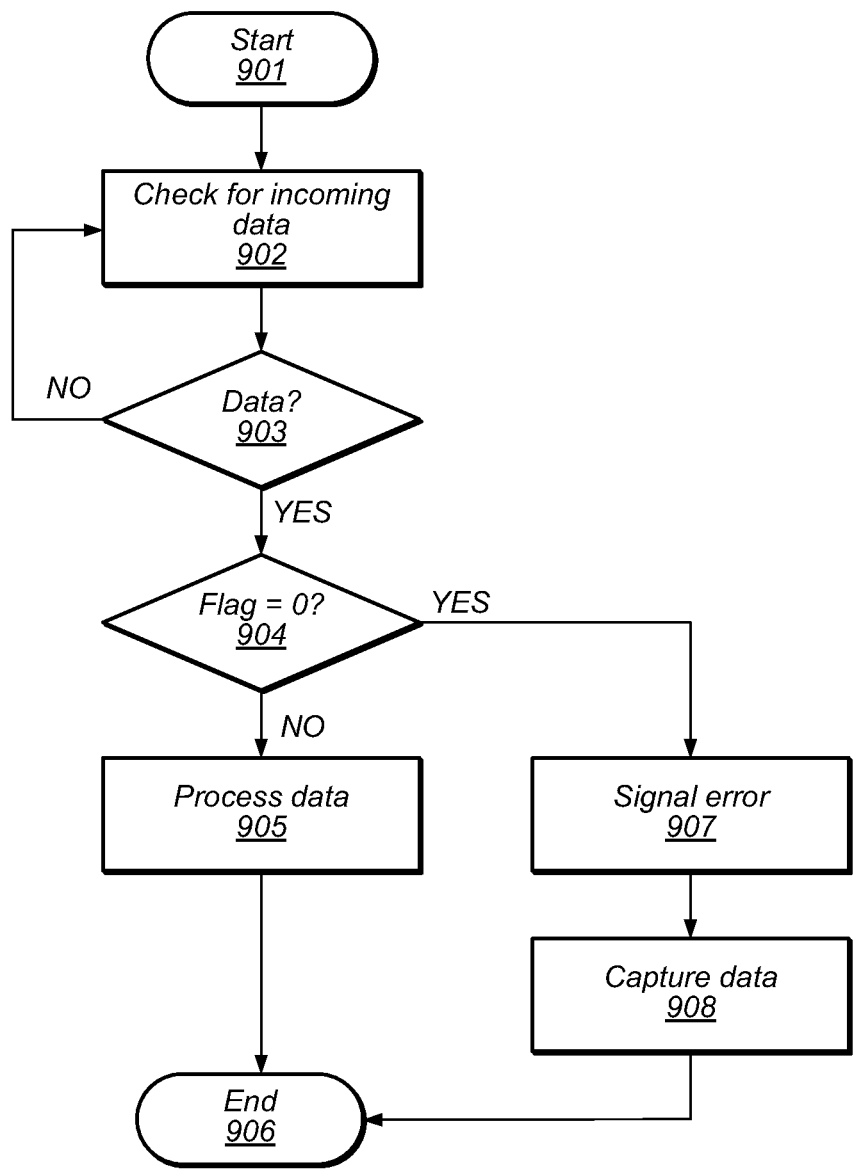
FIG. 9 illustrates a flowchart depicting an embodiment of a method for error checking with a snoop control finite-state machine.

An embodiment of a method for operating a snoop control FSM, such as, e.g., coherence processing/snoop control FSM for detecting errors is illustrated in FIG. 9. In some embodiments, the method depicted in FIG. 9 may be employed by flows not being used during the processing of a transaction. The method begins in block 901.

A check may then be made for incoming data (block 902). In some embodiments, a shadow flip-flop, such as, e.g., shadow flip-flop 805 may be used to detect incoming data. The method may then depend upon whether data was received (block 903). When no data has been received, continued monitoring for incoming data may be performed (block 902).

When data is received, the status of an expected data register may be checked (block 904). In some embodiments, the expected data register flag may be set to a pre-determined value, such as, e.g., a logical-0 value, prior to the start of a flow. The pre-determined value may indicate that no data is expected to be returned for the flow.

When data is expected, the incoming data may be processed (block 905). The method may then conclude (block 906). When no incoming data is expected, an error may be signaled (block 907). Once an error has been signaled, the unexpected data may then be captured (block 908), and the method may then conclude (block 906). In some embodiments, the unexpected data may be the result of an error on a bus, such as, e.g., bus 204 as illustrated in FIG. 2. Such errors may result in incorrect identification information within a packet of data. Errors within a data packet's identification information may result in a data packet being sent to a functional block or FSM that is not expecting data. In some embodiments, the detection and capture of erroneous data packets may allow for the debug of a system, and a determination of how the packet was corrupted.

It is noted that the method illustrated in FIG. 9 is merely an example. In other embodiments, different operations and different orders of operations are possible and contemplated.

Figure 10:
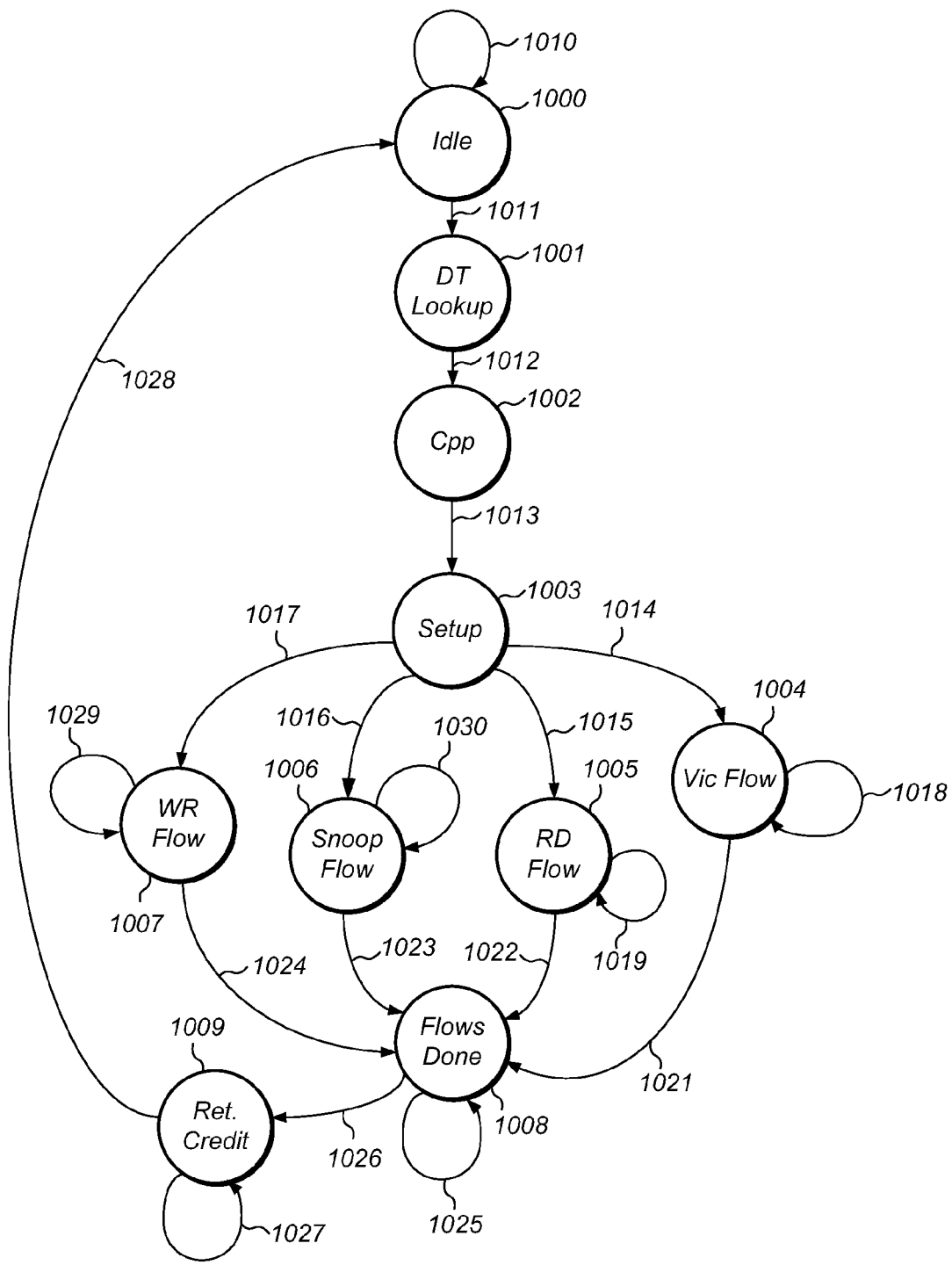
FIG. 10 illustrates a state diagram depicting another embodiment of a method for operating a snoop control state machine.

Turning to FIG. 10, an embodiment of a state diagram depicting the operation of a FSM is illustrated. In some embodiments, the illustrated state diagram may correspond to the operation FSM 306 as illustrated in FIG. 3.

The operation may begin with the FSM in Idle state 1010. The FSM may remain in Idle state 1010 (transition 1010) until a new transaction is received. When a new transaction is received, the FSM may transition to DT lookup state 1001 (transition 1011). During DT lookup state 1001, one or more duplicate tags may be checked to determine if data requested in the transaction is already cached. Once the duplicate tags have been examined, the FSM may then transition to Cpp state 1002 (transition 1012). During Cpp state 1002, pre-processing of the received transaction may occur. The pre-processing may, in some embodiments, include determining the type, such as, e.g., a write transaction, and an evaluation of duplicate tag information to determine the processing necessary to complete the transaction.

Once pre-processing has been completed, the FSM may send the transaction along with the information determined during pre-processing to one of multiple flow-management state machines (transition 1013). Such an arrangement may, in various embodiments, allow for multiple transactions to be processed in parallel. The selected flow-management state machine may then enter setup state 1003. In some embodiments, expected data flags may be initialized, during setup state 1003.

The flow-management state machine may then transition to one of write flow state 1007, snoop flow state 1006, read flow state 1005, or victim flow state 1004, through transitions, 1017, 1016, 1015, and 1014, respectively. In some embodiments, more than one of the aforementioned states may be active simultaneously dependent upon the type of transaction, and any duplicate tag information.

Each of the aforementioned flow states may perform one or more processing tasks to complete the respective flow. In some embodiments, the processing tasks may include requests for data from a memory, such as, e.g., memory 201 as illustrated in FIG. 2. Each of the aforementioned flows may remain active (transitions 1029, 1030, 1019, and 1018) until the tasks included in each flow have been completed.

The flow-management state machine may then receive information regarding the completion of each of the aforementioned flows via transitions 1024, 1023, 1022, and 1021. The flow management state machine may remain in flows done state 1008 (transition 1025) until notification has been received from each active flow. In some embodiments, a dependency may exist between one or more of the aforementioned state flows.

When all of the flows have completed, the flow-management state machine may transition to return credit state 1009 (transition 1026). In some embodiments, credits may be used to control the flow of data on a bus, such as, e.g., bus 204 as illustrated in FIG. 2. Credits may, in some embodiments, need to be returned in order free resources for processing other transactions. The flow-management state machine may remain in credit return state 1009 (transition 1027) until the credit is returned, at which point the flow-management state machine goes idle and is ready to process another transaction (transition 1028).

It is noted that the state diagram illustrated in FIG. 10 is merely an example. In other embodiments, different states, and different transitions between states are possible and contemplated.

Figure 11:
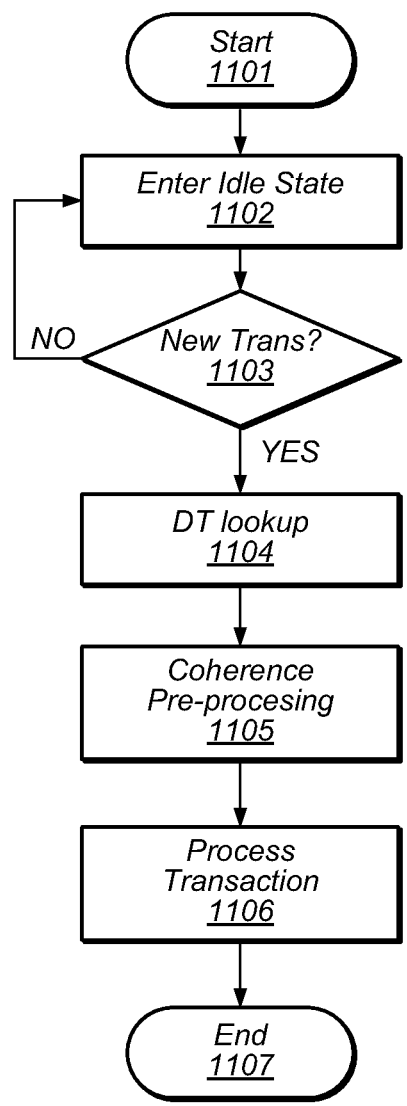
FIG. 11 illustrates a flowchart depicted another embodiment of a method for operating a snoop control state machine.

An embodiment of a method for operating a FSM, such as, e.g., coherence processing/snoop control FSM and scoreboard logic 306 as illustrated in FIG. 3, is depicted in FIG. 11. The method begins in block 1101. The FSM may then enter and idle state (block 1101). In some embodiments, the idle state may correspond to a situation in which the transaction table entry corresponding to the FSM is empty.

The method may then depend on whether a new transaction is received (block 1103). When no transactions have been received, the FSM remains in an idle state (block 1102). When a new transaction has been received, duplicate tag information may be checked (block 1104). In some embodiments, a duplicate tag circuit, such as DT 302 as illustrated in FIG. 3, may include copies of tags from cache memories. Address information contained in the received transaction may be compared to the contents of the duplicate tag circuit to determine if the address information contained in the received transaction resides in any cache memories.

Coherency pre-processing of the transaction may then be performed dependent upon results received duplicate tag information (block 1105). In some embodiments, the pre-processing may include, without limitation, determining what processing flows (i.e., collections of processing steps) need to be performed for the transaction, determining what information is needed to complete the coherency processing, generating requests for the required information, and the like. Expected responses may, in other embodiments, also be determined, and flags for unused flows may be set to a pre-determined value, such as, e.g., zero, indicating that no responses are expected for the unused flows.

The transaction may then be processed (block 1106). In some embodiments, multiple transactions may be processed simultaneously. Once pre-processing has been performed for a received transaction, the transaction may be placed in a queue waiting for resources to become available to process the transaction. When a transaction has been processed, the resources associated with the processed transactions may then be employed to process another transaction awaiting processing. Once the all transactions waiting for processing have been processed, the method concludes (block 1107).

It is noted that the method illustrated in FIG. 11 is merely an example. In other embodiments, different operations or different orders of operations are possible and contemplated.

Figure 12:
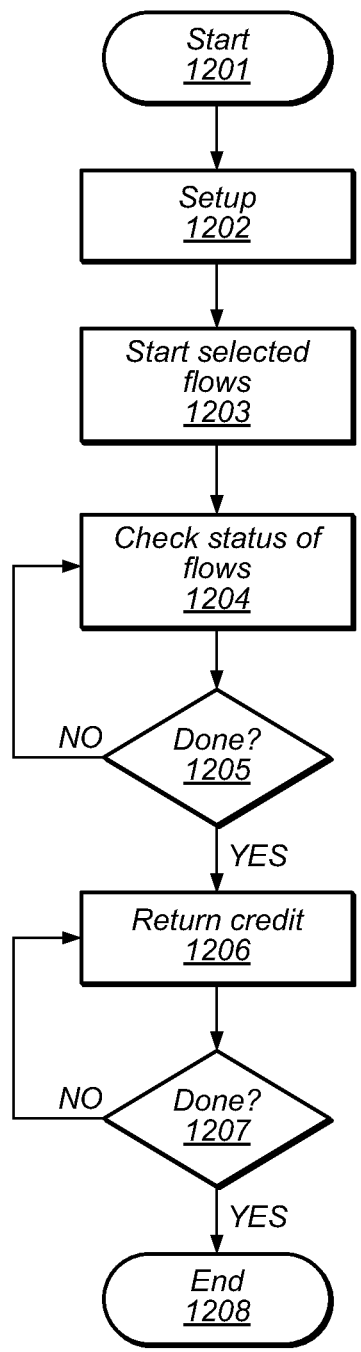
FIG. 12 illustrates a flowchart depicting a method for processing coherency flows.

Turning to FIG. 12, an embodiment of a method for coherency processing is illustrated. In some embodiments, the method depicted in FIG. 12, may correspond to the operation performed in block 1106 of the flowchart illustrated in FIG. 11. The method begins in block 1201.

Setup steps may then be performed (block 1202). In some embodiments, the setup may include determining which processing flows are required. Expected data flags may, in other embodiments, be set to a pre-determined value during setup. Once any setup has been completed, one or more flows may be started (block 1203). In some embodiments, the flows may include, without limitation, a read flow, a write flow, a snoop flow, and a victim flow. The flows may, in some embodiments, be executed sequentially, while in other embodiments, the flows may be performed in parallel.

Once the needed flows have been activated, the status of the flows may be checked (block 1204). In various embodiments, the different flows may require differing amounts of time to complete dependent upon the availability of resources, such as, e.g., a memory, that are needed to complete the flows. The completion of one flow may, in some embodiments, depend upon the completion of one or more other flows.

The method may then depend on if all of the flows being performed have been completed (block 1205). When the flows have not been completed, the status of the flows continues to be monitored (block 1204). When all of the flows being employed have completed, an attempt may then be made to return the credit for the transaction (block 1206). In some embodiments, credits may be employed to control the flow of transactions on a communication bus, such as, e.g., bus 204 as illustrated in FIG. 2. A credit may, in other embodiments, need to be returned in order to release resources for other transactions. The method may then depend on if the credit was returned (block 1207). When the credit cannot be returned, additional attempts are made (block 1206). When the credit is returned, processing of the transaction may be complete (block 1208).

The operations illustrated in FIG. 12 are depicted as being performed in a sequential manner. In other embodiments, one or more of the illustrated operations may be performed in parallel.

Numerous variations and modifications will become apparent to those skilled in the art once the above disclosure is fully appreciated. It is intended that the following claims be interpreted to embrace all such variations and modifications.

What is claimed is:

1. An apparatus, comprising:
a finite-state machine configured to track a progress of a transaction from one or more functional blocks within an integrated circuit;
a processor configured to transmit a plurality of coherence requests dependent upon the transaction;
a scoreboard circuit configured to track the plurality of coherence requests and a respective plurality of received responses;
wherein the finite-state machine is further configured to detect errors in the respective plurality of received responses.

2. The apparatus of claim 1, wherein the scoreboard circuit includes a plurality of registers, wherein each register of the plurality of registers is set dependent upon a respective one of the plurality of coherence requests.

3. The apparatus of claim 1, wherein the scoreboard circuit is further configured to generate a completion signal dependent upon the logical state of the plurality of registers.

4. The apparatus of claim 1, wherein the finite-state machine comprises a sequential logic circuit.

5. The apparatus of claim 1, wherein to detect errors in the respective plurality of received responses, the finite-state machine is further configured to detect unexpected data packets.

6. The apparatus of claim 5, wherein the finite-state machine includes one or more flip-flops configured to detect the unexpected data packets.

7. The apparatus of claim 1, wherein to track the progress of the transaction, the finite-state machine is further configured to transition between a plurality of logical states responsive to the progress of the transaction.

8. A method, comprising:
receiving a transaction from a given one of a plurality of functional blocks within an integrated circuit;
tracking the progress of the received transaction;
determining if the received transaction requires coherency processing;
sending a plurality of coherency requests to at least one of the plurality functional blocks dependent upon the determination that the received transaction requires coherency processing; and
tracking the progress of the plurality of coherency requests and a respective plurality of responses, wherein tracking the progress of the plurality of coherency requests and the respective plurality of responses comprises:
setting the logical state of a given register of a plurality of registers dependent upon the sending of a respective one of the plurality of coherency requests;
resetting the logical state of the given register of the plurality of registers dependent upon a respective one of the respective plurality of responses;
checking for errors in the respective plurality of responses.

9. The method of claim 8, wherein the checking for errors comprises detecting unexpected data packets.

10. The method of claim 9, wherein detecting unexpected data packets comprises capturing unexpected data packets in one or more flip-flop circuits.

11. The method of claim 8, wherein receiving the transaction from the one or more functional blocks comprises storing information indicative of the transaction in a queue.

12. The method of claim 11, wherein the information indicative of the transaction comprises a request address.

13. The method of claim 11, wherein tracking the progress of the received transaction further comprises determining the received transaction has completed dependent upon the current state of the finite-state machine.

14. The method of claim 13, further comprising invalidating the stored information in the queue responsive to the determination that the received transaction has completed.

15. A system, comprising:
a memory;
a coherency unit coupled to the memory; and one or more processors coupled to the coherency unit, wherein each of the one or more processors includes a cache memory;

wherein the coherency unit includes:
- a queue to store a plurality of transactions from the one or more processors; and
- a plurality of finite-state machines, wherein each finite-state machine of the plurality of finite-state machines is configured to track the progress of a respective one of the plurality of transactions;
- a plurality of scoreboard circuits, wherein each scoreboard circuit of the plurality of scoreboard circuits is configured to determine when a respective one of the plurality of transactions has completed.

16. The system of claim 15, wherein the coherency unit further includes a duplicate tag circuit configured to store copies of tag data stored in the cache memories of the one or more processors.

17. The system of claim 15, wherein each scoreboard circuit of the plurality of scoreboard circuits includes one or more state registers.

18. The system of claim 17, wherein the logical state of the one or more state registers is dependent upon one or more coherency requests, where the one or more coherency requests are dependent upon the respective one of the plurality of transactions.

19. The system of claim 15, wherein each finite-state machine of the plurality of finite-state machines is further configured to detect unexpected data packets from the one or more processors.

20. The system of claim 15, wherein the memory comprises a dynamic random access memory (DRAM).

* * * * *